J. M. KIRBY & B. E. HARTSON.
CATTLE GUARD FOR RAILROADS.
APPLICATION FILED JAN. 26, 1916.
1,193,561.
Patented Aug. 8, 1916.
2 SHEETS—SHEET 1.
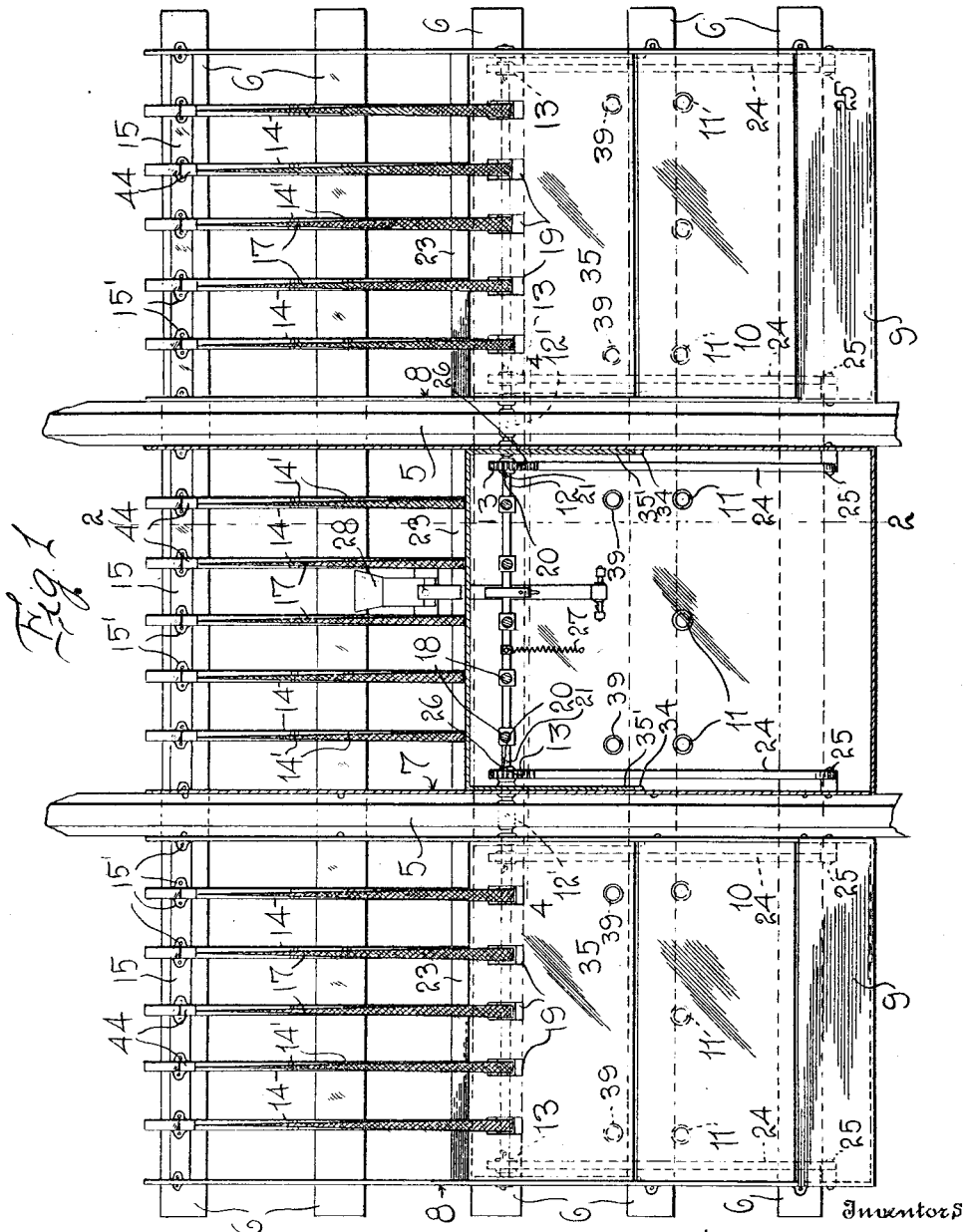
Inventors
JOSEPH M. KIRBY
B. E. HARTSON
By Watson E. Coleman
Attorney J. M. KIRBY & B. E. HARTSON.
CATTLE GUARD FOR RAILROADS.
APPLICATION FILED JAN. 26, 1916.
1,193,561.
Patented Aug. 8, 1916.
2 SHEETS—SHEET 2.
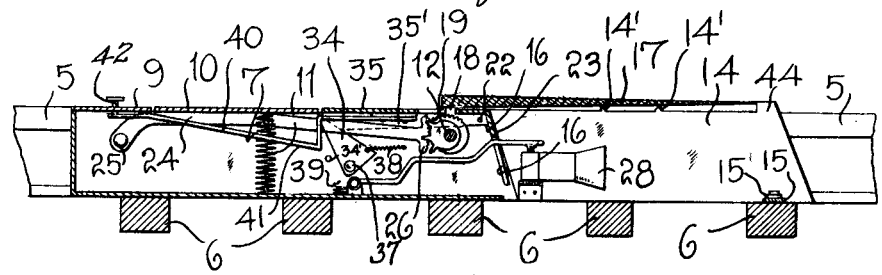
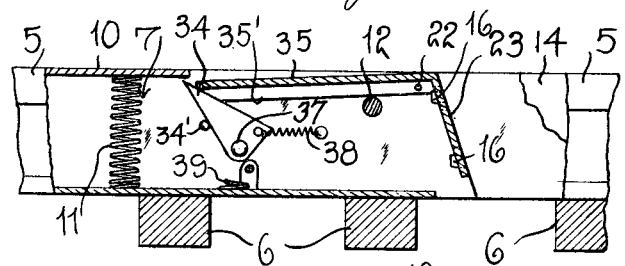
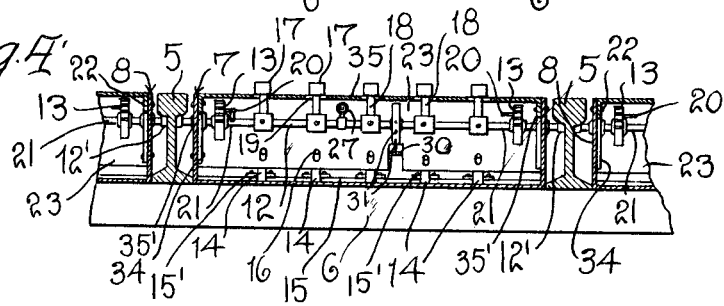
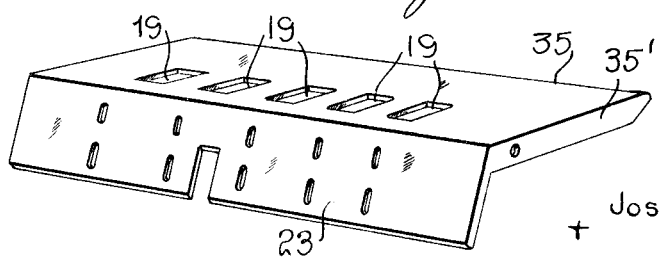
Inventors
JOSEPH M. KIRBY
B. E. HARTSON
By Watson E. Coleman
Attorney

UNITED STATES PATENT OFFICE.

JOSEPH M. KIRBY AND BERT E. HARTSON, OF BOULDER, COLORADO.

CATTLE-GUARD FOR RAILROADS.

1,193,561.  Specification of Letters Patent.  Patented Aug. 8, 1916.

Application filed January 26, 1916. Serial No. 74,438.

*To all whom it may concern:*

Be it known that we, JOSEPH M. KIRBY and BERT E. HARTSON, citizens of the United States, residing at Boulder, in the county of Boulder and State of Colorado, have invented certain new and useful Improvements in Cattle-Guards for Railroads, of which the following is a specification, reference being had to the accompanying drawings.

This invention relates to an improved cattle guard for railroads and has for its primary object to provide simple, reliable and effective means operated by the animal when the same intrudes upon the right of way, whereby the animal will be frightened and caused to leave the track.

Another important object resides in the provision of a plurality of movable guard members arranged between the track rails on each side thereof, means for normally locking said guard members in a horizontal plane below the rail treads, and animal operated means for swinging said guard members upwardly past a vertical position toward the approaching animal, whereby the animal will be struck or frightened and prevented from advancing farther along the track.

It is another important object of the invention to provide means whereby the movable guard members will be automatically locked against operation when the animal approaches the same from one direction along the track until the animal has passed over the guard members and beyond the same.

The invention has for an additional object to provide manually operable means whereby the movable guard members may be locked against actuation so that the device may also be advantageously employed as a farm gate.

It is a further object of the invention to provide a device of the above character which is comparatively simple in its construction, may be installed at minimum cost, and is highly efficient and reliable in practical operation.

With the above and other objects in view, our invention consists in the novel features of construction, combination and arrangement of parts to be hereinafter more fully described, claimed and illustrated in the accompanying drawings, in which, Figure 1 is a top plan view illustrating the preferred embodiment of the invention; Fig. 2 is a section taken on the line 2—2 of Fig. 1; Fig. 3 is a similar view showing the tread plate or platform locked against operation; Fig. 4 is a section taken on the line 4—4 of Fig. 1; Fig. 5 is an enlarged perspective view of one of the vertically movable platforms.

Referring in detail to the drawings, 5 designates the track rails which are spiked in the usual manner to the ties 6. Upon these ties, between the track rails, an elongated metallic frame structure 7 is secured and similar side frames 8 are also secured upon the ties outside of the track rails. As the specific construction of these frames and the arrangement and mounting of the parts of the guard therein is identical in each instance, the following description of one will suffice for all.

Each of the frames has its side walls connected at one end by a stationary platform 9, and inwardly of this platform 9 a vertically movable platform 10 is mounted and yieldingly sustained by a plurality of coil springs 11. Inwardly from this latter platform and in spaced relation thereto, a transverse shaft 12 is journaled at its ends in the side walls of the frame 7. The opposed ends of these shafts mounted in the several frames, may be coupled together, as indicated at 12′, or the said shafts may operate independently of each other. Upon each of these shafts, adjacent to its opposite ends, an interrupted gear 13 is loosely mounted. A pin 20 projects inwardly from each of these gears in parallel relation to the shaft and is adapted for bearing engagement upon the pin 21 fixed in the shaft. Thus, it will be apparent that, when the loosely mounted gears are rotated in one direction, they will impart rotation in a corresponding direction to the shaft 12. Above the shafts 12 in each of the frames 7, a second vertically movable platform 35 is arranged, said platform having depending side walls or flanges 35′ which are fulcrumed adjacent one of their ends, as indicated at 22, upon the side walls of the frame 7. At its pivoted end, the platform 35 is formed with a downwardly projecting, obliquely disposed wall 23. The platform 35 is also yieldingly supported against downward movement by a plurality of coil springs 39.

In each of the frames, a series of spaced, longitudinally extending bars 14 are fixed at one of their ends by means of the brackets 15' to a transverse bar 15 which connects the spaced side walls of the frame. The other or inner ends of these bars 14 are obliquely inclined and provided with spaced pins 16 projecting longitudinally therefrom. These pins are adapted to loosely fit in spaced openings provided in the wall 23 of the platform 35. To each of the shafts 12 and in line with the several bars 14, the guard arms 17 are connected at one of their ends by the rods 18 fixed to the shaft 12 and projecting radially therefrom and upwardly through longitudinal slots 19 provided in the movable platform 35. In the normal position of these arms, the same extend in horizontal parallel relation to the several bars 14 above the same and rest upon spaced V-shaped ribs or spurs 14' formed upon the upper edges of said bars. By thus spacing the arms from the bars, the collection of snow and ice between the same and the freezing of the metal arms to the bars so as to prevent the unretarded operation of the former, is obviated.

The spring supported tread plate or platform 10 above referred to, rests at its opposite ends upon levers 24 which are pivoted, as at 25, to the side walls of the frame. To the other end of each lever 24, a toothed sector 26 is fixed and meshes with the teeth of the gear 13 on one end of the shaft 12. It is thus apparent that, when an animal treads upon the plate 10, said plate is forced downwardly against the sustaining action of the springs 11 and the levers 24 are thereby operated and the toothed sectors 26 on said levers forced downwardly, thus rotating the loosely mounted gears. The pins 20 on these gears engaging the pins 21 on the shaft 12, rotate the shaft and thereby swing the several guard arms 17 upwardly and forwardly toward the approaching animal. There is a sufficient number of teeth in each of the gears 13 to positively move the arms 17 through an arc of approximately 120° or past the perpendicular position. To each of the shafts 12, one end of a coil spring 27 is connected, the other end of said spring being suitably attached to the frame 7. When the shaft is rotated in the manner above explained, this spring is placed under tension and as soon as the animal leaves the track, said spring contracts and reverses the rotation of the shaft 12, thus returning the several elements to their normal positions.

In conjunction with the movable guard arms 17, we provide a sound producing device indicated at 28, which may be of any ordinary or approved construction and is preferably arranged and operated as disclosed in our divisional application, filed April 5, 1916, Serial Number 89,150.

In each of the frames 7 upon the opposite side walls thereof and adjacent to the opposed edges of the movable walls of the platforms 10 and 35, the locking dogs 34, preferably of triangular shape as shown, are fulcrumed as at 37. Normally, the hypotenuse of each of these triangular dogs is vertically disposed and the ends of the side flanges on the platform 35 are obliquely cut for bearing engagement upon the upper angular edge of the respective dogs. The dogs are yieldingly held in their normal positions by the springs 38, and in such normal position it will be observed that the dogs do not interfere with the downward movement of the platform 10. Assuming, however, that the animal does not first approach the platform 10 but moves in an opposite direction along the track, it will be apparent that, when the animal moves over the bars 14 and treads upon the platform 35, this platform will be forced downwardly and the side flanges thereof will bear upon the inclined edges of the dogs 34 and rock said dogs to project the same beneath the inner edge of the other movable platform 10. This movement of the dogs is limited by the stop pins 34'. Thus, the latter platform cannot be depressed and the guard arms 17 operated until the animal has passed entirely over and beyond the guard arms and off of the platform 35. When this platform has been returned to its normal position by the springs 39, the springs 38 also act to return the dogs 34 to their normal positions and release the platform 10.

Each of the bars 14 is also provided on its upper edge, at its fixed end, with an inwardly projecting lug or shoulder 44 beneath which the free ends of the respective arms 17 are disposed when the arms are in their normal horizontal positions. The shoulder 44 affords a protection to the end of the guard arm and prevents the same being accidentally struck and bent or distorted from its normal inoperative position. These arms are preferably constructed of flexible spring steel, fiber or other suitable material which will not maim or injure the animal when struck thereby.

It is also the purpose of our invention to provide a device which is not only effective and reliable as a cattle guard, but may also be conveniently and serviceably employed as an ordinary farm gate. To this end, a bar 40 is rigidly fixed at one of its ends to the underside of the vertically movable platform 35. The bar is angularly bent or offset adjacent to this fixed end, as shown at 41, and then obliquely extended upwardly and beneath the platform 10 and the fixed platform 9, the extremity of the bar being disposed in position for convenient access. However, we also provide a pin or rod 42 fixed to this end of the bar 40 and projecting upwardly through an opening in the platform 9. This rod is adapted to be engaged by the foot, whereby the bar 40 may be depressed. Upon the depression of the bar 40, it will be readily seen that the platform 35 is also forced downwardly and the dogs 34 actuated to lock the platform 10 so that the levers 24 will not be actuated when this latter platform is tread upon. Thus, a person may safely walk over the platforms and the lowered gate bars. In this latter use of the device, the space between the several bars 14 is preferably filled with earth, or connecting boards fixed to said bars.

From the foregoing description, taken in connection with the accompanying drawings, it is believed that the construction, manner of operation, and several advantages of our invention will be clearly and fully understood. The apparatus provides a very simple and effective cattle or stock guard and prevents the animals from collecting upon the track and blocking the movement of trains. The guard arms 17 may be provided upon their upper faces with ribs or spurs so that when they strike the animal, they will cause sufficient pain to produce the desired effect. It is apparent that any desired number of these guard arms may be provided on each of the shafts 12. The relative arrangement of the several coöperating parts may also be varied as circumstances may require and modifications resorted to in the form and proportion of these elements without departing from the essential features or sacrificing any of the advantages of the invention.

Having thus fully described our invention, what we desire to claim and secure by Letters Patent is:—

1. In a cattle guard for railroads, the combination of guards mounted to swing in a vertical plane, animal actuated means operable when the animal approaches the guard from one direction to move the guards to their effective positions, and means also operated by the animal when approaching the guard from the opposite direction to lock said first named means against actuation and maintain the guards in their normal positions.

2. In a cattle guard for railroads, the combination of movable guard means arranged between the track rails, animal actuated means arranged upon one side of the guard means and operable in the approach of the animal from one direction for operating the latter, and additional means arranged upon the other side of the guard means and operable in the approach of the animal from the opposite direction to lock said first named means against operation.

3. In a cattle guard for railroads, the combination of movable guard means arranged between the track rails, animal actuated means for operating said guard means including a vertically movable tread plate, said means being operated by the animal when approaching the guard from one direction, and means operated by the animal when approaching the guard from the other direction to engage and lock the tread plate against operation.

4. In a cattle guard for railroads, the combination of movable guard means arranged between the track rails, animal actuated means for operating the guard means including a vertically movable tread plate adapted to be engaged and operated by the animal when approaching the guard from one direction, a movable locking dog, and animal actuated means operated when the animal approaches the guard from the opposite direction to move the locking dog into coöperative engagement with the tread plate and lock the latter against operation.

5. In a cattle guard for railroads, the combination of movable guard means arranged between the track rails, animal actuated means for operating the guard means including a vertically movable tread plate adapted to be engaged and operated by the animal when approaching the guard from one direction, a movable locking dog, and an animal actuated platform operated when the animal approaches the guard from the opposite direction, said platform being coöperatively engaged with the dog to move and project the same beneath the tread plate and lock the latter against operation.

6. In a cattle guard for railroads, the combination of movable guard means arranged between the track rails, animal actuated means for moving the guard including a vertically movable tread plate operated by the animal when approaching the guard from one direction, a second vertically movable platform actuated by the animal when approaching the guard from the opposite direction, and means actuated by said platform and to coöperatively engage and lock the tread plate against operation.

7. A device of the character described including a plurality of vertically movable bars, animal actuated means to move the bars from a horizontal inoperative position to a vertical operative position, animal actuated means for locking the first named means against operation, and manually operable means for actuating said locking means.

8. A device of the character described including a plurality of vertically movable bars, animal actuated means to move the bars from a horizontal inoperative position to a vertical operative position, animal actuated means for locking the first named means against operation, said locking means including a vertically movable tread plate, and means connected to said tread plate and adapted to be manually operated to actuate said locking means.

9. A device of the character described including a plurality of spaced bars mounted for vertical swinging movement, animal actuated means to swing said bars from a horizontal inoperative position to a vertical operative position, animal actuated locking means operated when an animal approaches the device in one direction to lock said first named means against actuation, said locking means including a vertically movable tread plate, and a bar connected to said tread plate whereby the plate may be manually depressed to actuate the locking means.

In testimony whereof we hereunto affix our signatures in the presence of two witnesses.

JOSEPH M. KIRBY.
BERT E. HARTSON.

Witnesses:
CHAS. F. KINGSLEY,
JOHN M. WHITE.

Copies of this patent may be obtained for five cents each, by addressing the "Commissioner of Patents, Washington, D. C."